(12) United States Patent
Hayton

(10) Patent No.: US 9,628,448 B2
(45) Date of Patent: *Apr. 18, 2017

(54) USER AND DEVICE AUTHENTICATION IN ENTERPRISE SYSTEMS

(71) Applicant: Citrix Systems, Inc., Fort Lauderdale, FL (US)

(72) Inventor: Richard Hayton, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,000

(22) Filed: Aug. 1, 2015

(65) Prior Publication Data
US 2015/0350168 A1  Dec. 3, 2015

Related U.S. Application Data

(63) Continuation of application No. 13/886,518, filed on May 3, 2013, now Pat. No. 9,098,687.

(51) Int. Cl.
*G06F 21/00* (2013.01)
*H04L 29/06* (2006.01)
(Continued)

(52) U.S. Cl.
CPC .......... *H04L 63/0428* (2013.01); *G06F 21/31* (2013.01); *G06F 21/32* (2013.01);
(Continued)

(58) Field of Classification Search
CPC ....... H04L 9/32; H04L 9/3213; H04L 9/3234; H04L 9/3226; H04L 9/083; H04L 9/0846;
(Continued)

(56) References Cited

U.S. PATENT DOCUMENTS

2005/0278546 A1  12/2005  Babineau et al.
2007/0061571 A1*  3/2007  Hammes ................ G06F 21/31
713/168
(Continued)

FOREIGN PATENT DOCUMENTS

JP  2001075468 A  3/2001
JP  2004535004 A  11/2004
(Continued)

OTHER PUBLICATIONS

International Search Report and Written Opinion of PCT Application No. PCT/US2014/034362, dated Oct. 14, 2014.
Feb. 2, 2017 (JP)—First Office Action—App 2016-511754.

*Primary Examiner* — Kendall Dolly
(74) *Attorney, Agent, or Firm* — Banner & Witcoff, Ltd.

(57) ABSTRACT

Methods and systems for authenticating users of client devices to allow access of resources and services in enterprise systems are described herein. An authentication device may validate a user based on authentication credentials received from a client device. Validation data stored by the authentication device, and a corresponding access token transmitted to the client device, may be used to authenticate the user for future resource access requests. A user secret also may be stored by the authentication device and used to validate the user for future resource access requests. Additionally, after validating a user with a first set of authentication credentials, additional sets of credentials for the user may be retrieved and stored at an access gateway for future requests to access other services or resources in an enterprise system.

20 Claims, 7 Drawing Sheets

(51) Int. Cl.
  *G06F 21/31*   (2013.01)
  *G06F 21/32*   (2013.01)
  *G06F 21/41*   (2013.01)

(52) U.S. Cl.
  CPC .......... *G06F 21/41* (2013.01); *H04L 63/0815* (2013.01); *H04L 63/0869* (2013.01)

(58) Field of Classification Search
  CPC ............. H04L 63/0428; H04L 63/0869; H04L 63/0815; G06F 21/31; G06F 21/32; G06F 21/41
  See application file for complete search history.

(56) References Cited

U.S. PATENT DOCUMENTS

| | | |
|---|---|---|
| 2007/0061885 A1 | 3/2007 | Hammes et al. |
| 2008/0021696 A1* | 1/2008 | Bartelt .............. G06F 17/30893 703/27 |
| 2010/0154066 A1 | 6/2010 | Hammes et al. |
| 2011/0004921 A1 | 1/2011 | Homer et al. |
| 2011/0099375 A1 | 4/2011 | Hammes et al. |
| 2012/0054487 A1 | 3/2012 | Sun et al. |
| 2013/0036460 A1 | 2/2013 | Lau et al. |
| 2014/0189359 A1* | 7/2014 | Marien ................. H04L 9/3234 713/172 |

FOREIGN PATENT DOCUMENTS

| | | |
|---|---|---|
| JP | 2007503637 A | 2/2007 |
| WO | 02102023 A1 | 12/2002 |
| WO | 2005022821 A1 | 3/2005 |

\* cited by examiner

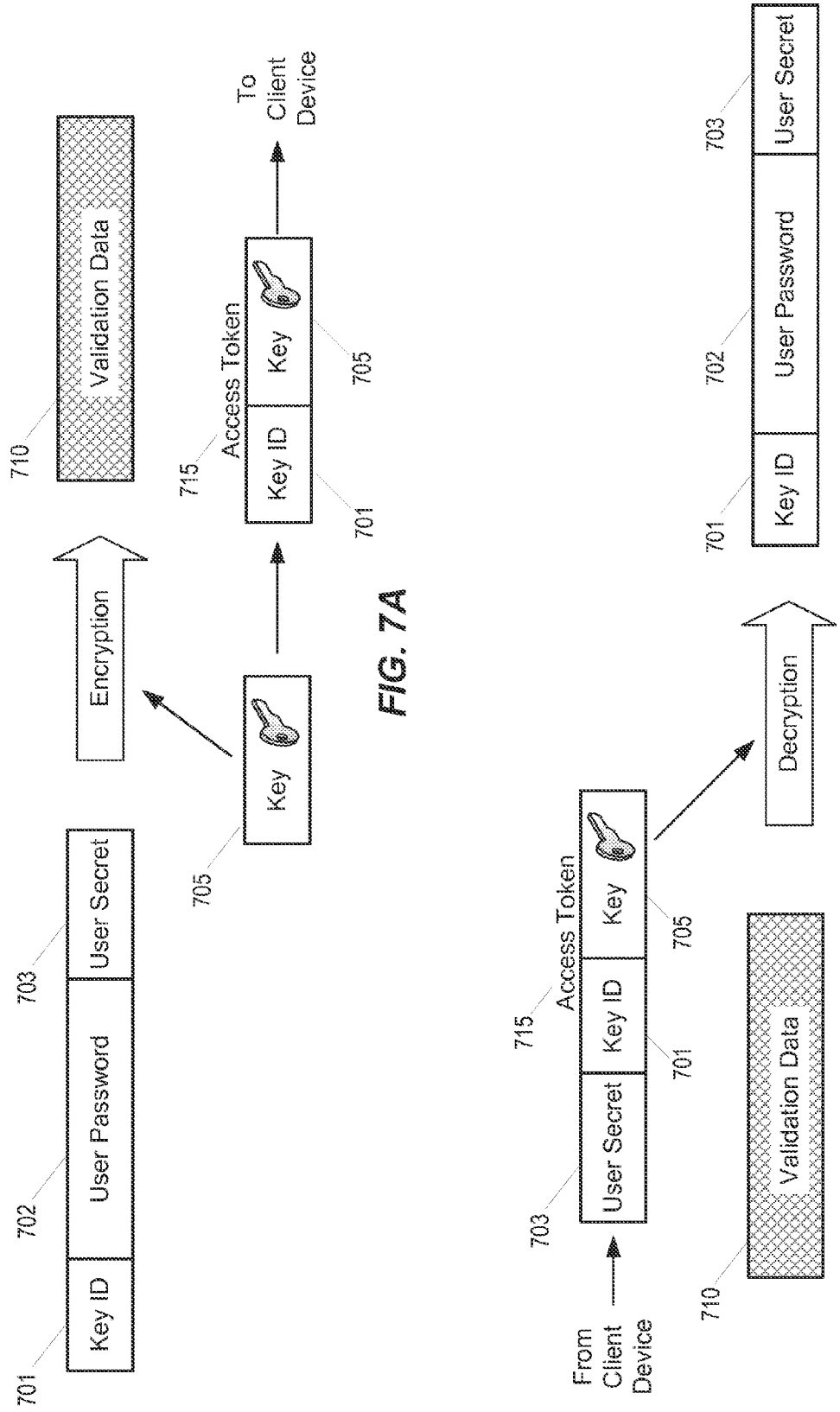

USER AND DEVICE AUTHENTICATION IN ENTERPRISE SYSTEMS

CROSS-REFERENCE TO RELATED APPLICATION

This application is a continuation of and claims priority to U.S. patent application Ser. No. 13/886,518, filed May 3, 2013, and entitled "USER AND DEVICE AUTHENTICATION IN ENTERPRISE SYSTEMS," the disclosure of which is incorporated by reference herein in its entirety and made part hereof.

FIELD

Aspects described herein generally relate to authentication of users within enterprise systems. More specifically, certain aspects herein provide approaches to securely authenticate users on mobile devices and other client devices to various resources and services in enterprise systems.

BACKGROUND

Mobile devices, such as smart phones, personal digital assistants, tablet computers, other types of mobile computing devices, are becoming increasingly popular. Mobile devices are used in personal and business settings for a variety of purposes. Additionally, many people have multiple computing devices, including one or more mobile devices. A user's different devices may be in different locations and may have different physical device capabilities. For example, a user may have a desktop computer with a standard keyboard and mouse interface, a mobile device with a touch screen interface and voice recognition capabilities, a laptop computer with a fingerprint scanner interface, and so on.

Users with multiple computing devices may desire to access the same data, applications, and other information using any of their devices. In order to access data and applications remotely via a client device, the user may first be authenticated by an authentication service and/or a remote resource or service providing the data and applications. Typically, a user enters authentication credentials, such as a username and password, into their device in order to validate their identity and access the remote resources or services of an enterprise system. Users may be required to re-authenticate periodically, for example, during communication sessions or at the beginning of a new session. Additionally, a single user may have different sets of authentication credentials for different remote resources or services.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards secure authentication of users on mobile devices and other client devices, and allowing access to various resources and services in enterprise systems. According to certain aspects, an authentication device may receive user authentication credentials, including a password (or token), from a client device. The user may be validated with the authentication credentials, and the authentication device may create validation data comprising the encrypted user password and an access token comprising the cryptographic key used to encrypt the password. The validation data may be stored by the authentication device, and the access token may be transmitted to the client device. For future resource access requests from the client device, the client device may transmit the access token, and the authentication device may retrieve and decrypt the validation data using the access token received from the client device.

According to additional aspects, a user may input a user secret, for example, a personal identification number, touch screen gesture, or biometric data, via an input interface of the client device. The user secret may be stored by the authentication device and used to validate future requests from the client device. For example, the user may re-enter the user secret for future requests, and the authentication device may compare the user secret in the request to the previously stored user secret corresponding to the same user, device, and/or requested resources or services.

According to further aspects, after validating a user with a first set of authentication credentials, one or more additional sets of authentication credentials may be retrieved for the first user and stored at an access gateway or other storage in an enterprise system. The additional sets of authentication credentials may correspond to different credentials of the same user for accessing various services or resources in the enterprise system. In future requests from the client device, the user may be validated based on the first set of authentication credentials, and then an additional set of authentication credentials may be retrieved and injected to the request depending on the requested service or resource.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 7A and 7B are diagrams illustrating example techniques for creating and using validation data and access tokens in an authentication process between a client device and an authentication device, in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
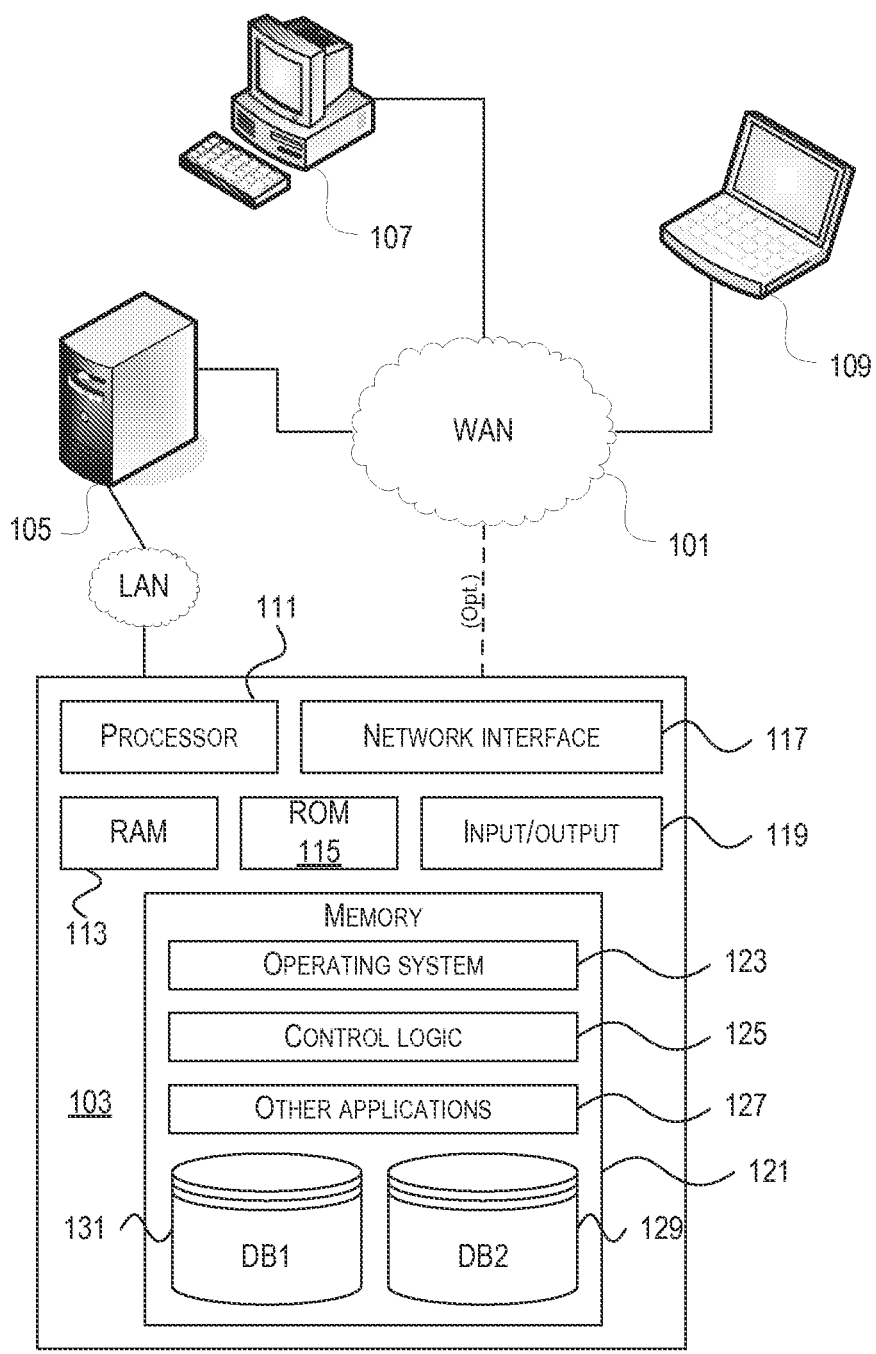
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MANs) wireless networks, personal networks (PANs), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107, a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
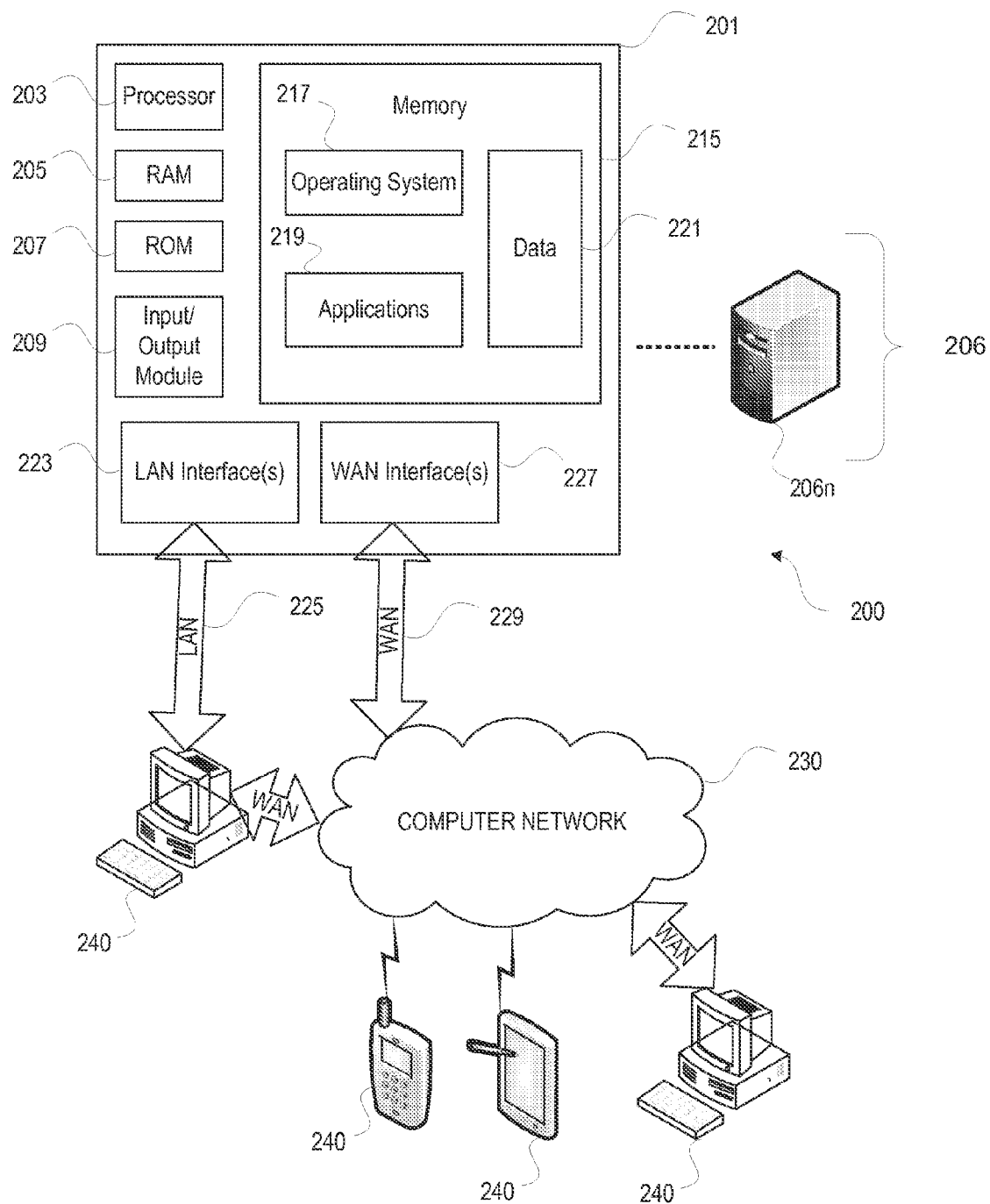
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. For example, generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the requests to a second server 206b, and responds to the requests generated by the client machine 240 with a response from the second server 206b. First server 206a may acquire an enumeration of applications available to the client machine 240, as well as address information associated with an application server 206 hosting an application identified within the enumeration of applications. First server 206a can then present a response to the client's requests using a web interface, and communicate directly with the client 240 to provide the client 240 with access to an identified application. One or more clients 240 and/or one or more servers 206 may transmit data over network 230, e.g., network 101.

FIG. 2 shows a high-level architecture which may be illustrative of a desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

When utilized in a desktop virtualization system, server 206 may be configured as virtualization server in a virtualization environment, for example, a single-server, multi-server, or cloud computing environment. In such embodiments, the virtualization server 206 may include a hardware layer including one or more physical disks, physical devices, physical processors, and physical memories. The memory 215 of the virtualization server 206 may include firmware, an operating system, and a hypervisor (e.g., a Type 1 or Type 2 hypervisor) configured to create and manage any number of virtual machines. A virtual machine is a set of executable instructions that, when executed by a processor, imitate the operation of a physical computer such that the virtual machine can execute programs and processes much like a physical computing device. The hypervisor may provide each virtual machine with a virtual view of the physical hardware, memory, processor and other system resources available to that virtual machine.

Some aspects described herein may be implemented in a cloud-based environment. In such environments, client devices 240 may communicate with one or more cloud management servers 206 to access the computing resources (e.g., host servers, storage resources, and network resources) of the cloud system. Cloud management servers 206 may manage various computing resources, including cloud hardware and software resources, and may provide user interfaces through which cloud operators and cloud customers may interact with the cloud system. For example, management servers 206 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. Management servers 206 also may include a set of APIs and/or one or more customer console applications with user interfaces configured to receive cloud computing requests from end users via client computers 240, for example, requests to create, modify, or destroy virtual machines within the cloud. Client computers 240 may connect to management server 206 via the Internet or other communication network, and may request access to one or more of the computing resources managed by management server 206. In response to client requests, the management server 206 may include a resource manager configured to select and provision physical resources in the hardware layer of the cloud system based on the client requests. For example, the management server 206 and additional components of the cloud system may be configured to provision, create, and manage virtual machines and their operating environments (e.g., hypervisors, storage resources, services offered by the network elements, etc.) for customers at client computers 240, over a network (e.g., the Internet), providing customers with computational resources, data storage services, networking capabilities, and computer platform and application support. Cloud systems also may be configured to provide various specific services, including security systems, development environments, user interfaces, and the like.

Cloud computing environments also may include a virtualization layer with additional hardware and/or software resources configured to create and manage virtual machines and provide other services to customers using the physical resources in the cloud. The virtualization layer may include hypervisors, as described above, along with other components to provide network virtualizations, storage virtualizations, etc. The virtualization layer may be as a separate layer from the physical resource layer, or may share some or all of the same hardware and/or software resources with the physical resource layer.

Enterprise Mobility Management Architecture

Figure 3:
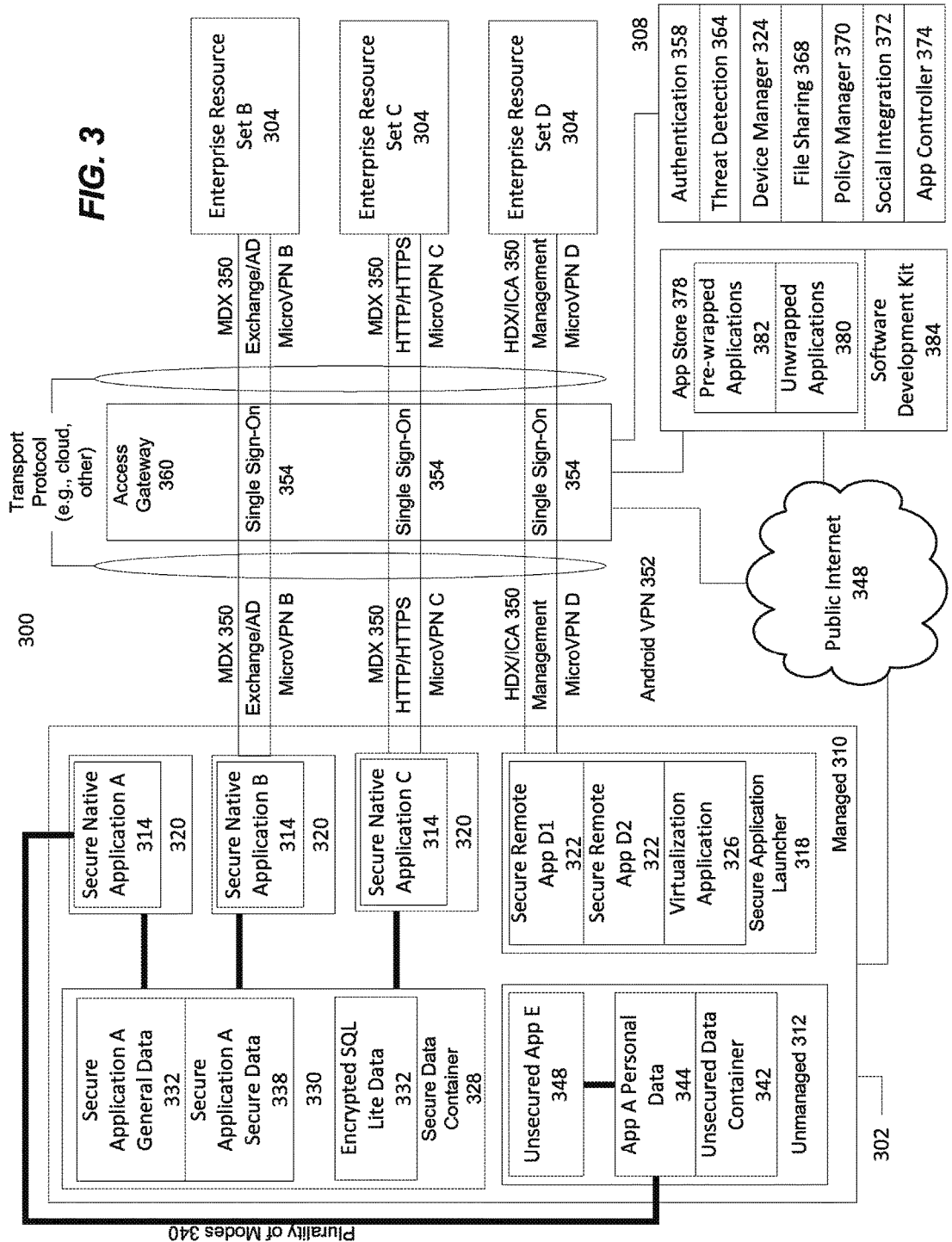
FIG. 3 depicts an illustrative enterprise mobility management system in accordance with one or more illustrative aspects described herein.

FIG. 3 represents an enterprise mobility technical architecture 300 for use in a BYOD environment. The architecture enables a user of a mobile device 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to the user. The user may utilize the mobile device 302 for business use only or for business and personal use. The mobile device may run an iOS operating system, an Android operating system, or the like. The enterprise may choose to implement policies to manage the mobile device 302. The policies may be implemented through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 302 that is managed through the application of mobile device management policies may be referred to as an enrolled device.

The operating system of the mobile device may be separated into a managed partition 310 and an unmanaged partition 312. The managed partition 310 may have policies applied to it to secure the applications running on and data stored in the managed partition. The applications running on the managed partition may be secure applications. The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed partition may be stabilized applications. The stabilized applications may be managed by a device manager 324. The device manager 324 may monitor the stabilized applications and utilize techniques for detecting and remedying problems that would result in a destabilized application if such techniques were not utilized to detect and remedy the problems.

The secure applications may access data stored in a secure data container 328 in the managed partition 310 of the mobile device. The data secured in the secure data container may be accessed by the secure wrapped applications 314, applications executed by a secure application launcher 322, virtualization applications 326 executed by a secure application launcher 322, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as AES 128-bit encryption or the like, while highly secure data 338 may use a very strong form of encryption such as AES 254-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured mode. In an unsecured mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections 352 may be specific to particular applications 350, particular devices, particular secured areas on the mobile device, and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface. The application store 378 may provide access to a software development kit 384. The software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
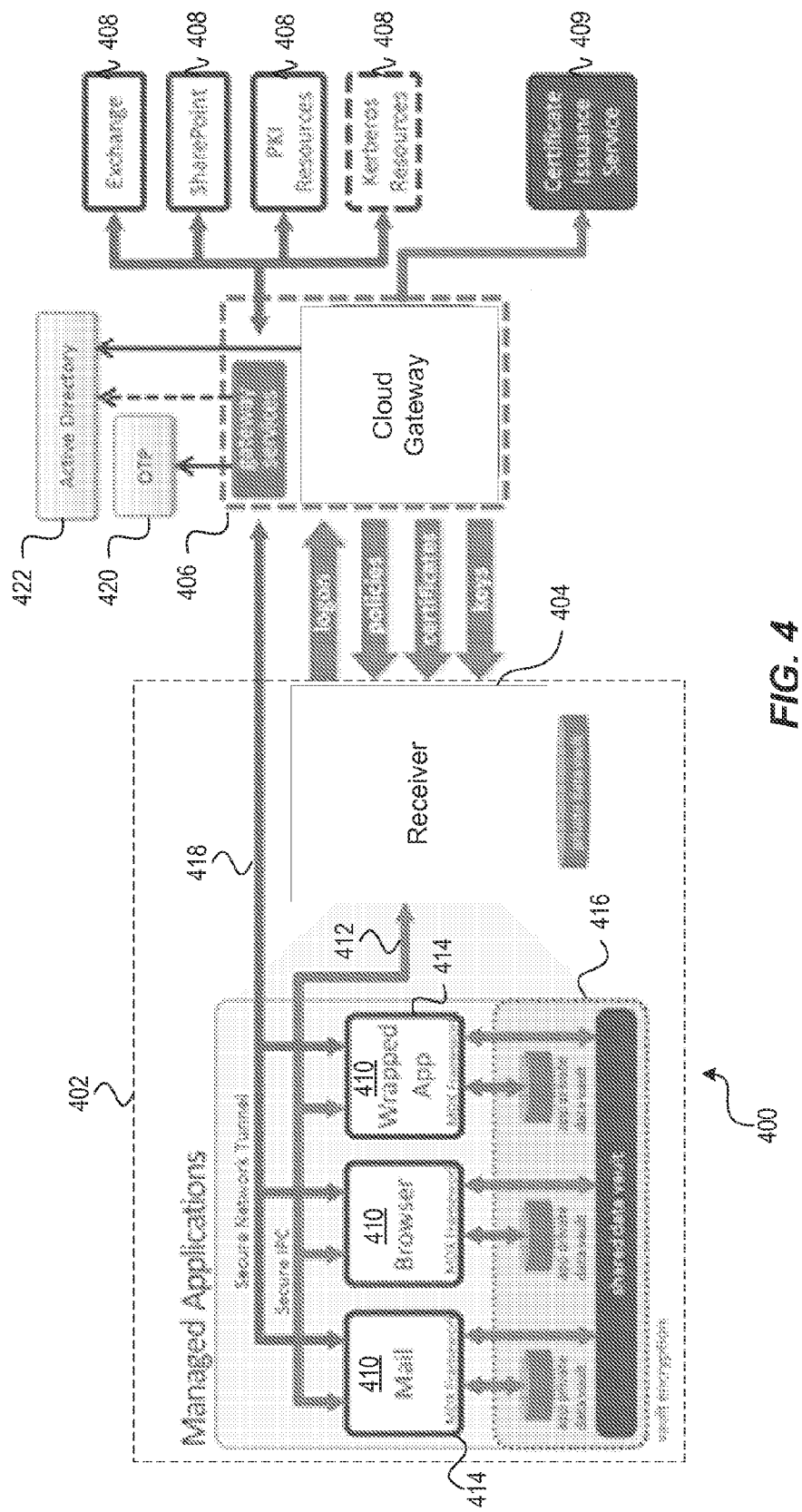
FIG. 4 depicts another illustrative enterprise mobility management system in accordance with one or more illustrative aspects described herein.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled mobile device 402 with a receiver 404, which interacts with cloud gateway 406 (which includes access gateway and application controller functionality) to access various enterprise resources 408 and services 409 such as Exchange, Sharepoint, PKI Resources, Kerberos Resources, Certificate Issuance service, as shown on the right hand side above. Although not specifically shown, the mobile device 402 may also interact with an enterprise application store (e.g., StoreFront) for the selection and downloading of applications.

The receiver 404 acts as the UI (user interface) intermediary for Windows apps/desktops hosted in an Enterprise data center, which are accessed using the HDX/ICA display remoting protocol. The receiver 404 also supports the installation and management of native applications on the mobile device 402, such as native iOS or Android applications. For example, the managed applications 410 (mail, browser, wrapped application) shown in FIG. 4 above are all native applications that execute locally on the device. Receiver 404 and MDX (mobile experience technology) of this architecture act to provide policy driven management capabilities and features such as connectivity and SSO (single sign on) to enterprise resources/services 408. The receiver 404 handles primary user authentication to the enterprise, normally to the access gateway (AG) with SSO to other cloud gateway components. The receiver 404 obtains policies from cloud gateway 406 to control the behavior of the MDX managed applications 410 on the mobile device 402.

The secure IPC links 412 between the native applications 410 and receiver 404 represent a management channel, which allows receiver 404 to supply policies to be enforced by the MDX framework 414 "wrapping" each application. The IPC channel 412 also allows receiver 404 to supply credential and authentication information that enables connectivity and SSO to enterprise resources 408. Finally the IPC channel 412 allows the MDX framework 414 to invoke user interface functions implemented by receiver 404, such as online and offline authentication.

Communications between the receiver 404 and cloud gateway 406 are essentially an extension of the management channel from the MDX framework 414 wrapping each native managed application 410. The MDX framework 414 requests policy information from receiver 404, which in turn requests it from cloud gateway 406. The MDX framework 414 requests authentication, and receiver 404 logs into the gateway services part of cloud gateway 406 (also known as NetScaler Access Gateway). Receiver 404 may also call supporting services on cloud gateway 406, which may produce input material to derive encryption keys for the local data vaults 416, or provide client certificates which may enable direct authentication to PKI protected resources, as more fully explained below.

In more detail, the MDX framework 414 "wraps" each managed application 410. This may be incorporated via an explicit build step, or via a post-build processing step. The MDX framework 414 may "pair" with receiver 404 on first launch of an application 410 to initialize the secure IPC channel and obtain the policy for that application. The MDX framework 414 may enforce relevant portions of the policy that apply locally, such as the receiver login dependencies and some of the containment policies that restrict how local OS services may be used, or how they may interact with the application 410.

The MDX framework 414 may use services provided by receiver 404 over the secure IPC channel 412 to facilitate authentication and internal network access. Key management for the private and shared data vaults 416 (containers) may be also managed by appropriate interactions between the managed applications 410 and receiver 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through the access gateway 406. The MDX framework 414 is responsible for orchestrating the network access on behalf of each application 410. Receiver 404 may facilitate these network connections by providing suitable time limited secondary credentials obtained following online authentication. Multiple modes of network connection may be used, such as reverse web proxy connections and end-to-end VPN-style tunnels 418.

The mail and browser managed applications 410 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, cloud gateway 406 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein cloud gateway 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (cloud gateway 406), and for off-line vaults, a local copy of the keys may be protected by a user password. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the MDX framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want the enterprise application store to be accessed in this manner. In this case, the receiver 404 may require the user to set a custom offline password and the AD password is not used. Cloud gateway 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the MDX micro VPN feature). For example, an application such as @WorkMail may utilize such a certificate. In this case, certificate-based authentication using ActiveSync protocol may be supported, wherein a certificate from the receiver 404 may be retrieved by cloud gateway 406 and used in a keychain. Each managed application may have one associated client certificate, identified by a label that is defined in cloud gateway 406.

Cloud gateway 406 may interact with an enterprise special purpose web service to support the issuance of client certificates to allow relevant managed applications to authenticate to internal PKI protected resources.

The receiver 404 and the MDX framework 414 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the MDX framework to mediate HTTPS requests).

MDX client certificate support on iOS may rely on importing a PKCS 12 BLOB (Binary Large Object) into the iOS keychain in each managed application for each period of use. MDX client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to cloud gateway 406 may also be implemented.

Both limited and full Kerberos support may be additional features. The full support feature relates to an ability to do full Kerberos login to AD 422, using an AD password or trusted client certificate, and obtain Kerberos service tickets to respond to HTTP negotiate authentication challenges. The limited support feature relates to constrained delegation in AFEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of the enterprise application store and the application controller may be supported that allows users to be serviced from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

User and Device Authentication in Enterprise Systems

Figure 5:
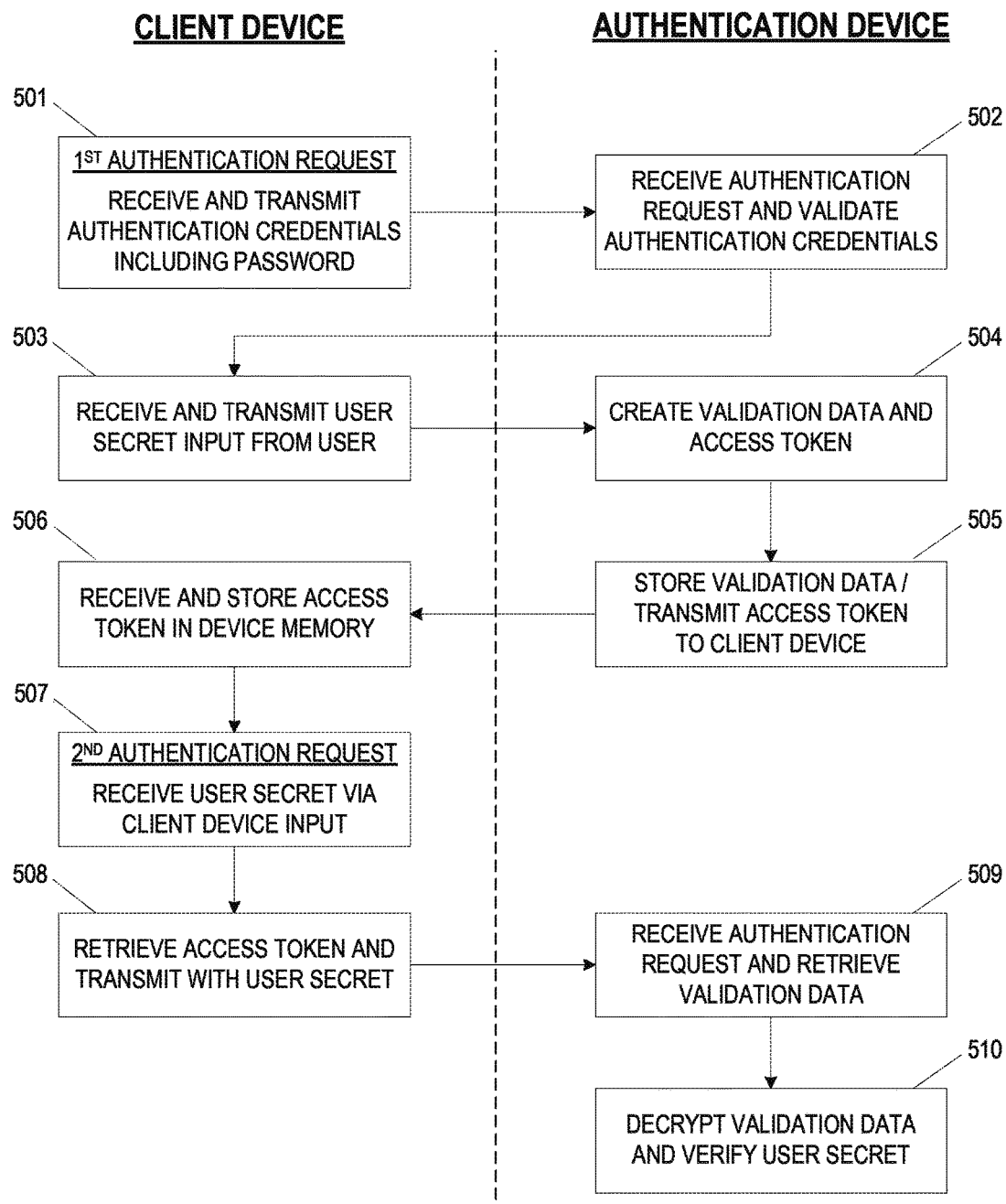
FIG. 5 is a flow diagram illustrating an example user authentication process between a client device and an authentication device, in accordance with one or more illustrative aspects described herein.
Figure 6:
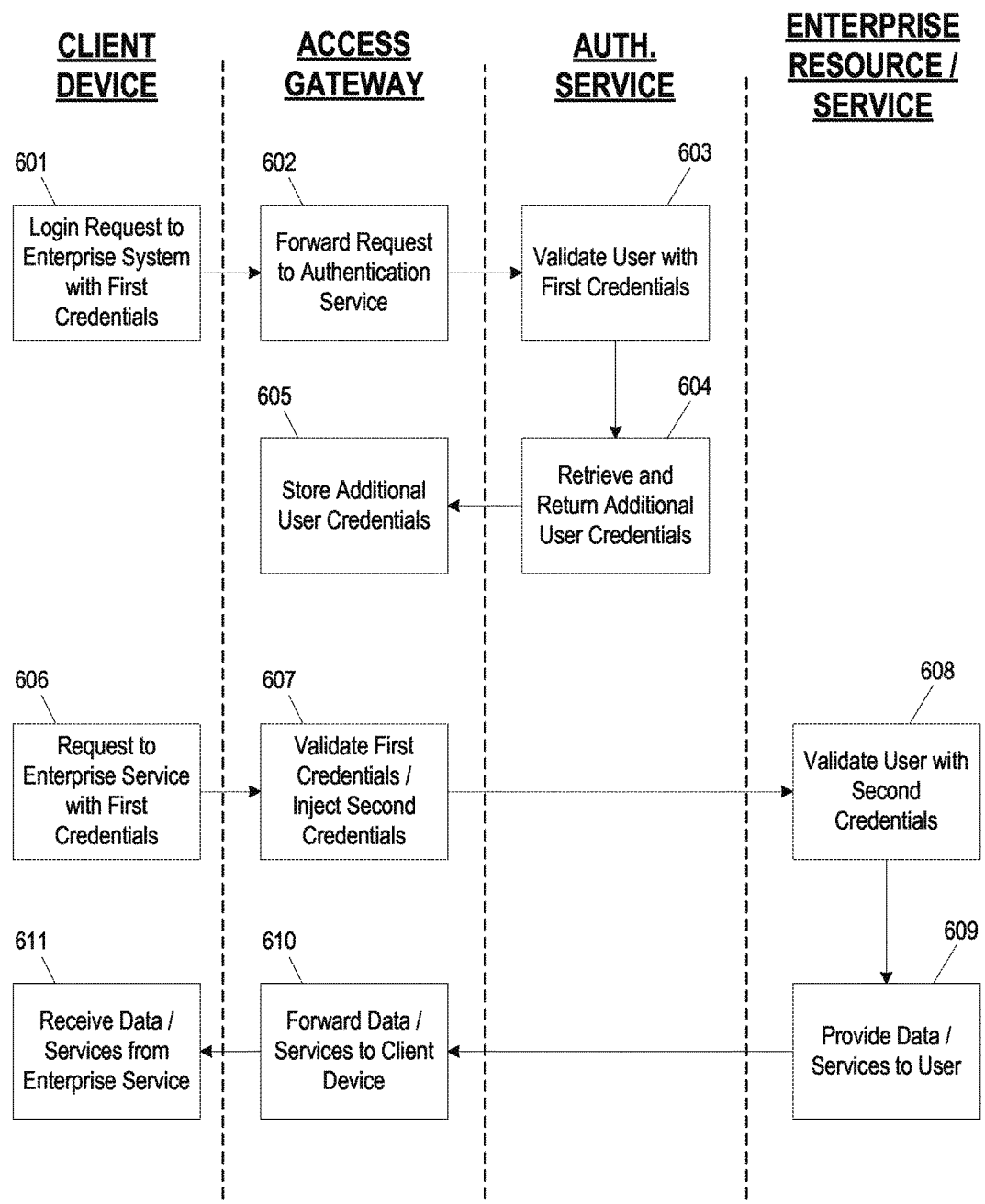
FIG. 6 is a flow diagram illustrating an example user authentication and resource access request between a client device and various components of an enterprise system, in accordance with one or more illustrative aspects described herein.

FIGS. 5 and 6 are flow diagrams illustrating various examples of features and methods of authenticating client devices in enterprise systems. The features and methods described below in reference to FIGS. 5 and 6 may be performed by a computing device or combination of devices, such as the various computing devices and systems shown in FIGS. 1 and 2, and may be implemented within various different types of enterprise systems, such as the illustrative mobility management systems shown in FIGS. 3 and 4, or any other enterprise system (i.e., any computing device that requires authentication when providing access to resources). FIGS. 5 and 6 relate to authentication and resource access control by an enterprise system for users accessing the system via remote client devices. For example, a user at a mobile device 302 or 402 may communicate with an enterprise system through an access gateway 360 or 406, provide authentication credentials to validate the user's identity, and then may request and access the various resources and services of the enterprise system.

The various embodiments and examples described in reference to FIGS. 5 and 6 may include several features and potential advantages for authentication and resource access control to users in enterprise systems. As described in more detail below, certain embodiments may allow users to input authentication credentials less frequently into their devices, and in some cases a simplified user secret may be entered instead of the user's full authentication credentials (e.g., username/password), which may provide convenience and time savings for device users, and particularly mobile device users. Additionally, increased flexibility may be provided for user authentication and resource access control functionality, whereby specific authentication credentials and/or authentication requests may be associated with specific enterprise services and resources and/or specific time periods. Enterprise system security also may be enhanced in various embodiments and examples, when secure credentials such as user passwords may be input less frequently (or not at all) by the user, and need not be stored at the client device, thereby protecting the user and the system in the event that the client device or communication network is compromised.

Referring now to FIG. 5, an example method is shown in which a client device (e.g., mobile device 302 and/or 402), and an authentication device (e.g., authentication service 358 and/or cloud gateway 406) communicate to authenticate (i.e., validate) a user of the enterprise system and enable the validated user to access the resources and services of the enterprise system.

In step 501, a first authentication request is initiated by a client device, such as a mobile device 302 or 402. The first authentication request may be login attempt by the client device 302 to the enterprise system, using a secured or unsecured application running on the client device 302, for example, a console application, a mobile application, or a web browser or other web-based application. The user of the client device 302 may input authentication credentials using an input interface and/or input device of the client device 302. For instance, the user may use a keyboard or touch screen to input a user identifier and password into the client device 302, which may be encrypted and/or transmitted securely to an access gateway 360 of the enterprise system. The access gateway 360 may be a secure server, and may be implemented as one or more separate computing devices (as shown in FIGS. 3 and 4), or alternatively may be implemented within a server or other computing device providing resources or services (e.g., an email server, a web application server, etc.). The access gateway 360 may support various additional authentication techniques, such as password-based, token-based (e.g., smart cards, magnetic strip cards), biometrics (e.g., fingerprint, voiceprint, iris or retina scanning), and the like. The authentication in step 501 may be single-factor or multi-factor, and may include multiple authentication steps (e.g., challenge questions), and mutual authentication techniques.

In step 502, the authentication device 358 receives the authentication request from the client device 302 and validates the user's authentication credentials to confirm that the user is a valid system user with permissions to access one or more resources or services of the enterprise system. In this example, the authentication device 358 may refer to a computing device(s) on which an authentication service 358 executes. As illustrated in FIG. 3, an access gateway 360 may receive the login request from the mobile device 302 and forward the login request to an authentication service 358 which verifies the user's credentials and grants the user access to the set of enterprise resources or services for which the user is authorized. The authentication service 358 may be implemented on one or more dedicated computing devices 358, on shared computing devices 358 that support other enterprise services 308 and/or resources 304, or may be implemented within the access gateway 360. In these examples, the authentication device 358 may be configured to validate (i.e., authenticate) users by presenting the credentials entered by the user to an authentication service, such as an active directory 422, which may rule on their accuracy/validity of the user's credentials.

After the user's credentials have been successfully validated in step 502, the user may be logged in to the enterprise system and may be granted access to resources 304 or services 308 within the enterprise system. The validation of the user in step 502 may be optional depending on the design of the enterprise system. Additionally, in certain examples, the user may be authorized to access some resources 304 and services 308, but might not be authorized to access others, depending on the user's permissions with respect to the various resources 304 and services 308 in the enterprise system.

In this example, after the user is validated in step 502, the user may be prompted in step 503 to input a "user secret" into the client device 302 to be used in future resource access requests. In other examples, users may be prompted to input user secrets before, after, or contemporaneously with the first authentication request in step 501 and validation in step 502. A "user secret" may be a personal identification number (PIN), touch screen gesture, biometric data, spoken phrase or visual image, or other data input into the client device 302 by the user. In step 503, users may be allowed to select a user secret type (e.g., text, PIN, gesture, password, spoken phrase, biometric, etc.) before inputting their user secret. In other examples, the user secret type may be selected automatically based on the physical capabilities of the client device 302, and the user may be prompted to input a user secret of the selected type. For instance, if the client device 302 is a mobile phone, PDA, or tablet computer with a touch screen, then the user may be prompted to input a touch screen gesture as a user secret. If the client device 302 includes a microphone and audio processing software, then the user may be prompted to speak a word or phrase as a user secret. Similarly, if the client device 302 includes a camera, then the user secret may be an image of the user's face, an item in the user's home or office, or another object selected by the user. Other examples of user secrets include text passwords input on keyboards, PINs input on keyboards or numeric keypads, and/or may be derived from various biometric data (e.g., fingerprints, iris scans, etc.) or visual images, etc.

In some examples, user secrets may be different from and/or simpler than the authentication credentials (e.g., username and password) required from users to login to the enterprise system. Many systems require strong user passwords, such as passwords having a minimum length, complexity, and/or unpredictability. Such passwords can be tedious for users to input, especially on devices such as mobile phones, PDAs, and tablet computers without traditional keyboards. In contrast, in some embodiments, the user secret may be permitted to be shorter and simpler than the password, and thus quicker to input into the client device 302. Additionally, it may be optional or even required for a user to select a user secret that is different from the user's password input in step 501. Therefore, if the user's secret is compromised (e.g., by malware at the client device 302), then the user's password may remain protected and the overall security of the enterprise system may be enhanced.

In step 503, software within the client device 302 and/or software with the enterprise system may initiate a function to prompt the user of the client device 302 to input a user secret. For example, the authentication device 358 may initiate a function to prompt the user to input a secret in response to the successful validation of the user's credentials in step 502. In this example, the authentication device 358 may first determine if a user secret has previously been set for client device 302, and if not, may prompt the user to input a user secret. The client device 302 also may initiate a function to prompt the user to input a user secret. For example, a receiver application 404 (or other client-based application 410) may suggest that the user input a user secret in order to simplify future resource access requests to the enterprise system. The receiver 404 or other client application 410 may first determine whether or not the user has previously input a user secret, and/or may confirm with the user that the client device 302 is not a shared device, before prompting the user to input a user secret. In some examples, a user secret may be received and transmitted contemporaneously with the first authentication request. Thus steps 501 and 503 may be combined into a single step, and similarly steps 502 and 504 may be combined into a single step. Additionally, as discussed in more detail below, user secrets may be optional and need not be supported in some embodiments, and thus steps 503 and 504 need not be performed in some examples.

In step 504, the authentication device 358 in the enterprise system may receive the user secret from the client device 302, and may create validation data and an access token to be used for future resource access requests from the client device 302. In some examples, the client device 302 may initiate a call to the authentication service 358, passing into the authentication service the user secret input in step 503. The client device 302 also may pass into the authentication service 358 additional data confirming that the client device 302 is currently logged into the enterprise system, such as a session cookie or token.

The authentication device 358 may then create validation data, to be stored by the enterprise system (e.g., within the authentication device 358, access gateway 360, or elsewhere within the enterprise system), and may create an access token, to be transmitted to the client device 302 in step 505. As discussed below, the access token and the validation data may be used for future requests from the client device 302 to the enterprise system. In some embodiments, an access token may include a cryptographic key (e.g., an encryption or decryption key) generated by the authentication device 358 or received from a key generator, and the validation data may be created by the authentication device 358 using the cryptographic key to encrypt one or more of the following: a key identifier corresponding to the user and/or client device; the user's current password or other authentication credentials; and the user's secret input in step 503. A key identifier may be a user identifier (e.g., username or login), or may be a separate identifier such as a table index used to locate the correct validation data.

Referring to FIG. 7A, an example is shown of creating validation data 710 and an access token 705 by an authentication device 358 in step 504. In this example, the authentication device collects a key identifier 701 (e.g., a username or table index corresponding to the user's validation data), the user's password 702, and the user secret 703 input by the user in step 503. The user's password 702 may include a password, token (e.g., a Security Assertion Markup Language (SAML) token), or user credential data. The authentication device 358 encrypts this data using a cryptographic key 705, which may be generated by the authentication device 358 or received from encryption key generator within the enterprise system. The resulting encrypted data is the validation data 710, which may be stored within the enterprise system in step 505 and may be used to authenticate future requests from the user. The authentication device 358 in this example also creates an access token 715 including the key identifier 701 and the cryptographic key 705 used to encrypt the validation data 710. In step 505, the access token 715 may be transmitted by the authentication device 358 to the client device 302.

As shown in FIG. 7A, the validation data 710 may be generated by encrypting a key identifier 701, password 702, and user secret 703. However, in other examples, all three pieces of data need not be used, and the validation data 710 may be generated by encrypting only one or two of these pieces of data. The validation data 710 also may include combination of encrypted and unencrypted data, or may be stored entirely as unencrypted data in some examples. For instance, the validation data 710 may be generated in some embodiments by appending the encrypted password 702 to an unencrypted key identifier 701. Similarly, the access token 715 may include the cryptographic key 705 and user key 701, as shown in FIG. 7A, or alternatively may include only the cryptographic key 705. The access token 715 also may include additional information, such as data identifying multiple users associated with the access token 715, one or more client applications associated with the access token 715, a set of enterprises resources and/or services associated with the access token 715, and an access time period or expiration date associated with the access token 715.

In step 506, the client device 302 receives and stores the access token 715 transmitted by the authentication device 358 in step 505. As discussed above, the access token 715 may include an encryption/decryption key 705 without including an encrypted or unencrypted copy of the user's password 702 or secret 703. Accordingly, the access token 715 may be stored in a secure or unsecured memory within the client device 302.

In step 507, the user initiates a second authentication request to the enterprise system. Like the first authentication request, the second authentication request may be a login attempt to the enterprise system and/or a request to access resources 304 or services 308 of the enterprise system. The second authentication request may be made via the same client application used to make the first authentication request, or with a different client application. For instance, the first authentication request may be a login attempt made with a receiver application 404, and the second authentication request may be made by a separate client application 410 (e.g., email client 410, web browser 410, etc.) to access specific enterprise resources or services. The second authentication request may occur shortly after the first authentication request (e.g., within the same network communication session), or may occur long after the first authentication request (e.g., after the expiration of any previous session cookies or tokens).

For the second authentication request, the client device 302 may prompt the user to input the user's secret, rather than the user's password (or other authentication credentials). As discussed above, the user's secret may be shorter and simpler than the user's password, and thus may be easier for the user to remember and quickly input at the client device 302. Additionally, the user secret need not be a text string input via a traditional keyboard, but may be entered using another input interface, depending on the capabilities of the client device 302 and the preferences of the user (e.g., a touch screen gesture, PIN, spoken phrase, or biometric data, etc.).

In step 508, the client device 302 retrieves the access token previously stored in the device memory, and sends the second authentication request, with the access token and the user secret input by the user in step 507, to the authentication device 358. For embodiments in which user secrets are not used, the second authentication request might include the access token retrieved from the device memory, but not a user secret. Thus, although step 507 potentially may involve some user action, for example, opening a client application 404 or 410, step 507 need not involve prompting the user to input a user secret in certain embodiments. In such examples, the access token may be retrieved and submitted to the authentication device 358 without any explicit action by the user, or even without the user's knowledge.

In step 509, the authentication device 358 receives the second authentication request from the client device 302. After receiving the second authentication request, the authentication device 358 may retrieve the corresponding validation data for the client device 302, previously stored in step 504. For example, if the second authentication request includes a key identifier 701, then the authentication device 358 may use the key identifier 701 to look up and retrieve the validation data 710 corresponding to the user and/or client device 302. A key identifier 701 may be associated with a specific enterprise user/login, with a specific client device 302, or with a combination of a user and a device. For instance, if a single user of the enterprise system has multiple client devices (e.g., a desktop computer, laptop computer, and one or more mobile devices), then each client device may have a separate key identifier 701 and/or a separate access token 715. Additionally, because the input types of user secrets may be based on the capabilities of the client device (e.g., touch screen gestures, voice recognition, biometric input), it may be preferable for some users to establish different user secrets for their different devices. In these examples, the authentication device 358 may use the key identifier 701 and/or user secret 703 to look up and retrieve the appropriate validation data 710 that corresponds to the user and/or client device 302 from which the second authentication request was received.

In step 510, the authentication device attempts to decrypt the validation data 710 using the access token 715 received in the second authentication request. As discussed above, a cryptographic key 705 that may be used to decrypt the validation data 710 was previously transmitted within the access token 715 to the client device 302 in step 504. Therefore, if the same access token 715 is returned from the client device in step 508, then the authentication device 358 may extract the key 705 and successfully decrypt the validation data.

Referring to FIG. 7B, an example is shown of validating an authentication request an authentication device 358, using a user secret 703 and access token 715 received from a client device 302. In this example, after receiving the second authentication request from the client device 302, the authentication device 358 may use the key identifier 701 to identify the user and retrieve the appropriate corresponding validation data 710 from the memory of the enterprise system. The authentication device 358 may then extract the key 705 from the authentication request and use the key 705 to decrypt the validation data 710. If the decryption is successful, the authentication device 358 may compare the user secret 703 from the decrypted validation data, with the user secret 703 received from the client device 302 with the request. If the user secrets match, the authentication device 358 may conclude that the user secret 703 and the access token 715 are valid, and thus the second authentication request is a valid request from the same user that was successfully validated in step 502. In embodiments in which a user secret 703 is not used, the authentication device 358 may conclude that the second authentication request is valid based on the validation of the decryption using the access token 715, without needing to validate a user secret 703.

In the examples shown in FIGS. 7A and 7B, the user secret 703 is stored within the validation data 710. However, in other examples, the user secret need not be stored within the validation data 710. For instance, the validation data 710 may be used to construct the access token 715 (or part of the access token 715). In certain embodiments, the key identifier 701, a user identifier, and/or a user password or token 702 may be encrypted with the cryptographic key 705 to create the validation data 710. Then, the access token 715 may be created using the key identifier 701 and the output of a comingling function (e.g., an exclusive OR function) performed on the key 705 and the user secret 703. In such examples, when validating the authentication request (corresponding to step 510 and FIG. 7B), the authentication device 358 may retrieve the user secret from a storage within the enterprise system, and may use the user secret to perform a reverse comingling function on the access token 715, which may return the cryptographic key 705. The authentication device 358 may then use the key identifier 701 to retrieve the corresponding validation data 710 from storage, and may use the key 705 to decrypt the validation data 710, thereby providing the user identifier and/or user password or token 702.

Even if the user secret 703 and the access token 715 received from the client device 302 are valid, the authentication device 358 might not grant the user access to the requested resources if the user's password 702 has been changed or has expired. For example, after confirming the validity of the user secret 703 and access token 715 received from the client device 302, the authentication device 358 may be configured to communicate with a domain controller, active directory, or other service to confirm that the user's password 702 in the validation data 710 is still up to date and valid. If the user's password 702 has expired, then the authentication device 358 may initiate a function prompting the user to enter a new password for the enterprise system, after which the authentication device 358 may update the user's password within the system and also may create new validation data 710 with the new password 702. After changing the user's system password 702, the authentication device 358 also may require the user to create a new user secret 703, or alternatively may allow the user to keep the same user secret 703.

The authentication device 358 also may determine that the user's password 702 is no longer valid, for example, because the user has recently logged into the enterprise system using a different client device and changed their password 702. In this case, after confirming that the user secret 703 and the access token 715 are valid, but that the password 702 is not valid, the authentication device 358 may require to user to re-authenticate on the client device 302 with the user's current password. After the user re-authenticates, the authentication device 358 may create new validation data 710 with the new password 702. The authentication device 358 may optionally require the user to input a new secret 703, and may optionally create and transmit a new access token 715 to the client device 302.

As noted above, user secrets may be optional in some embodiments. In such cases, the validation data encrypted by the authentication device 358 may include only a key identifier and/or password for the user authenticated in step 502. Thus, the user need not input a user secret in step 503, or in step 507 before sending the second authentication request. When a user secret is not used, the access token may be created by the authentication device 358 automatically, and then transmitted to the client device 302 after the first successful authentication request. The access token then may be stored on the client device 302, and retrieved and transmitted in subsequent authentication requests back to the enterprise system, without any explicit action taken from the user (and possibly without the user even knowing that access tokens are being used). Additionally, in certain embodiments, user secrets may be entered by the user (e.g., in steps 503 and/or 507), but may or may not be used by the authentication device 538, depending on the resources and services requested. A user may establish a user secret in step 503, but the authentication device 538 might require the user to reenter the user secret in step 507 only to access certain resources and/or perform certain actions, but not for others. For instance, a user secret might not be required in order for the user to read email or access certain secure documents, but may be required to send emails or modify the secure documents.

In some cases, access tokens and/or user secrets may have associated time periods or expiration dates, which may be stored within the enterprise system. In such cases, the authentication device 358 may retrieve the associated time period or expiration date after receiving an authentication request containing an access token. If the access token is valid and has not yet expired, the user may be granted access to the requested resources or services of the enterprise system. However, if the access token received from the client device 302 has expired or is no longer valid, then the authentication device 358 may require the user to re-enter the user's full authentication credentials (e.g., username and password), at which time the access token may be reset for an additional time period. In some embodiments, the user may be required to enter a new and different user secret after the expiration of a previous access token on the client device 302. Additionally, access tokens may be explicitly revoked by the authentication device 358 and/or client device 302. For example, access tokens may be revoked by the authentication device 358 by removing (or marking as revoked) the associated validation data entries. Lists of users or devices also may be stored in the enterprise system for whom this access method is not permitted.

Certain access tokens and/or user secrets also may be associated with specific resources or services within the enterprise system. For example, an access token stored on the client device 302 may be successfully validated when the user requests access to a first enterprise resource 304, but the same access token may be rejected when the user requests access to a different enterprise resource 304. In this example, the authentication device 358 may store a list of enterprise resources or services corresponding to each access token/validation data pair. When the authentication device 358 receives a request for enterprise resources or services with an access token, the authentication device 358 may retrieve the list of enterprise resources associated with the access token, and may grant or deny the request accordingly.

Therefore, in some examples, multiple different access tokens may be created for and stored on a single client device 302. For instance, a first access token may be valid for requests for certain enterprise resources 304 or services 308, while a second access token may be valid for requests for other enterprise resources 304 or services 308, and so on. In this example, the client application (e.g., receiver 404 or application 410) may retrieve and transmit the correct access token from the memory of the client device 302 depending on the resources requested. Because some client applications, such as web browser 410 or email client 410, may be associated with specific enterprise resources, these client applications 410 may be configured to retrieve and transmit a particular access token for all requests. In other cases, a client application may identify the specific resources 304 or services 308 being requested by the user, and the correct access token may then be retrieved from the device memory. Further, if a single client device (e.g., desktop computer or mobile device) is shared by multiple users, then multiple access tokens (or multiple sets of access tokens) may be stored in the memory of the client device 302. In these examples, the client application (e.g., receiver 404 or application 410) may be configured to retrieve and transmit the access token associated with the current user of the device.

Referring now to FIG. 6, an example method is shown in which a client device (e.g., mobile device 302 and/or 402), an access gateway (e.g., access gateway 360 and/or cloud gateway 406), an authentication service 358, and an enterprise resource or service (e.g., resources 304 and/or services 308 or 408) may interact to validate a user with a first set of authentication credentials to an enterprise resource 304 or service 308 accepting a second set of authentication credentials.

In step 601, a user at a client device 302 initiates a login request to the enterprise system including a first set of authentication credentials. The login request in step 601 may be similar to the first authentication request (step 501) described above in FIG. 5. As described above, the login request may be transmitted from the client device 302 via a client application such as a receiver 404 or other application 410 (e.g., email client, web browser, etc.). The login request in step 601 may include a first set of authentication credentials, for example, a username and password, data from a smart card, biometric data, or other type of user authentication data. The first set of authentication credentials also may be similar to the authentication credentials transmitted in step 508 of FIG. 5, for example, including a user secret 703 and/or access token 715.

In step 602, the login request may be received by an access gateway 360. The access gateway 360 may determine that the request is a new request from a client device 302, for example, it may determine that the request is not part of an existing communication session with an enterprise resource 304 or service 308. After determining that the request is a login request, the access gateway 360 may route the login request and authentication credentials to an authentication service 358 to validate the credentials and determine whether or not the user is authorized to login to the enterprise system. Although the authentication in this example may be performed via the access gateway 360, in other examples the authentication need not be performed via the gateway 360.

In step 603, the authentication service 358 receives and validates the first set of authentication credentials, to confirm that the user is a valid user and is authorized to login to the enterprise system. The validation in step 603 may be similar to the validation of the first authentication request (step 502) described above in FIG. 5. In order to validate the user in step 603, the authentication service 358 may be configured to access a secure data storage or service within the enterprise system, such as an active directory or domain controller, to verify the first set of user authentication credentials. After successfully validating the user with the first set of credentials in step 603, the user may be logged in to the enterprise system and may be granted access to various resources 304 or services 308 of the enterprise system.

Additionally, after validating the user with the first set of credentials in step 603, the authentication service 358 may be configured to retrieve one or more additional sets of credentials for the same user in step 604. Within the enterprise system, a single user may have multiple different authentication credentials corresponding to different enterprise resources 304 and services 308. For example, a user may have a first set of credentials (e.g., username and password) to login to the enterprise system, a second set of credentials to login to the user's email server 304, a third set of credentials to access a web-based application on a web application server 304, a fourth set of credentials to invoke a file sharing service 368, and so on. Thus, in step 604, the authentication service 358 may access various enterprise services and resources, such as an active directory, a domain controller service, and/or a user credential database. The authentication service 358 also may initiate communication with individual enterprise services 308 and resources 304 (e.g., Exchange, Sharepoint, PKI Resources, Kerberos Resources, Certificate Issuance, etc.) in order to retrieve the authentication credentials of the same user for these individual services and resources.

After retrieving the additional sets of credentials for the user in step 604, the authentication service 358 may transmit the additional sets of credentials to the access gateway 360. In step 605, the access gateway 360 may receive and store the additional sets of credentials for the user in a memory within the gateway 360 or other storage accessible to the gateway 360. In some embodiments, the user's additional sets of credentials may be stored securely within the gateway 360 and/or may be stored external to the gateway 360 to provide additional security for the enterprise system, in the event that the gateway 360 is compromised. In the example shown in FIG. 6, steps 604 and 605 may be performed in response to a successful user validation in step 603. In other examples, the retrieval and storage of additional credentials in step 604 and 605 may be performed at later time. For instance, steps 404 and 405 may be performed after step 606, in response to a request by the access gateway 360 to the authentication server 358 for the secondary credentials.

The additional sets of user credentials stored in 605 also may be encrypted, for example, in the form of the validation data 710 described above in reference to FIG. 5. In such examples, the sets of authentication credentials for different users may be encrypted using different cryptographic keys 705. As described above, these different keys 705 may be transmitted in access tokens 715 to the client devices 302 of the different users. Thus, if a user's key 705 is compromised by a malicious party with access to the authentication credentials stored on the gateway 360, then the malicious party could only decrypt the passwords/credentials of that user, and could not decrypt the passwords/credentials of other users which were encrypted with different keys 705.

In step 606, the user at a client device 302 initiates a request to an enterprise resource 304 or service 308 within the enterprise system, using the same first set of credentials used for the login request in step 601. The request in step 606 may be another login request and/or a request for data or services from a resource 304 or service 308 in the enterprise system, for example, an email server 304, file sharing server 304, web application server 304, device manager service 324, file sharing service 368, social integration service 372, or any other resource or service provided by the enterprise system.

In step 607, the access gateway 360 may receive and validate the user's first set of credentials, and then may inject a second different set of credentials into the request before routing the request to the appropriate resource 304 or service 308. After receiving the request from the client device 302, the access gateway 360 may validate the user's first set of credentials to confirm that the user is a valid system user with permissions to access the requested resource 304 or service 308. The user validation in step 607 may be similar to the validation by the authentication service 358 described above in any of steps 603, 502, and/or 510. For example, the access gateway 360 may verify the user's authentication credentials by comparing them to the user credentials stored at the gateway 360 in step 605, or within a secure data storage or service within the enterprise system, such as an active directory or domain controller. In other cases, the user validation in step 607 may be performed using a token/cookie, rather than by validation of the first credentials. For example, after a first validation of user credentials in steps 601-603, the access gateway 360 may return a session token or cookie to the client device 302. In step 606, the client device 302 may use the session token or cookie in lieu of the first credentials, and in step 607 the access gateway may confirm that the received token or cookie was issued by the gateway 360 and is still current.

After verifying that the user is authorized to access the requested resource 304 or service 308, the access gateway 360 may determine if the requested resource 304 or service 308 will accept the first set of authentication credentials entered by the user in step 606. As discussed above, a single user may have multiple different authentication credentials for the different resources 304 and services 308 in the enterprise system. If the requested resource 304 or service 308 will not accept the user's first set of authentication credentials, then the access gateway 360 may retrieve and inject the appropriate set of the authentication credentials into the request. For instance, if the user's first set of authentication credentials are the user's enterprise system username and password, or are a access token 715 and a previously entered user secret 703, then the requested resource 304 or service 308 (e.g., email server, web application server, etc.) may not accept these user authentication credentials. Thus, in step 607, the access gateway 360 may retrieve a second set of valid user credentials from the authentication credentials stored in step 605, and may inject the second set of credentials into the request before forwarding the request to the resource 304 or service 308.

In step 608, the requested enterprise resource 304 or service 308 receives and validates the request from the access gateway 360. Since the access gateway 360 injected the second set of valid user credentials into the request, the resource 304 or service 308 may successfully verify the user using the second set of credentials just as though the credentials had been entered directly by the user at the client device 302. The validation in step 608 may involve multiple authentication steps and/or one or more challenge-response verifications. However, because the access gateway 360 has the request from the client device 302 and the proper authentication credentials for the user to access the resource 304 or service 308, the gateway 360 may handle all authentication challenges without the involvement of the user or the client device 302.

After the resource 304 or service 308 validates the user with the second set of credentials in step 608, the requested data and/or services may be provided by the resource 304 or service 308 to the validated user in step 609. In step 610, the access gateway 360 receives the requested data and/or services from the enterprise resource or service, and forwards the data to the client device 302, and, in step 611, the client device 302 receives and provides the requested data and/or services to the user.

Thus, in this example, the access gateway 360 may act as a proxy server between the client device 302 and the requested resource 304 or service 308. That is, because the access gateway 360 validates the first set of user credentials, and then retrieves and injects the second set of user credentials in the request, it may appear to the client device 302 that the first set of credentials are being submitted to the resource 304 or service 308, and it may appear to the resource 304 or service 308 that the correct second set of credentials were provided by the user at the client device 302. A user at the client device 302 may thus use a single set of authentication credentials to successfully login to multiple different resources 304 and services 308 that require different sets of the credentials. This functionality may be transparent to the user, so that the user need not know the correct authentication credentials for many different resources 304 and services 308, but may nonetheless access these different resources 304 and services 308 with a single sign-on using a single set of authentication credentials. Moreover, when only a single set of authentication credentials are known to the user, and are stored and transmitted by the client device 302, this single set of credentials might not include a secure password or any other enterprise system authentication data. For example, as discussed above, the first set of authentication credentials may be a user secret 703 and/or access token 715 including a key 705 that may be used to decrypt one or more encrypted passwords for the user.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a computing system associated with an enterprise mobility-management computing environment and from a client device associated with a user of the enterprise mobility-management computing environment, a first authentication request comprising authentication credentials for a resource of the enterprise mobility-management computing environment;
responsive to authenticating the client device with the resource based on the authentication credentials:
storing, by the computing system, validation data comprising the authentication credentials and an identifier corresponding to at least one of the client device or the user;
generating, by the computing system, an access token for the enterprise mobility-management computing environment comprising the identifier and a key utilized by the computing system to encrypt the authentication credentials; and
communicating, by the computing system and to the client device, the access token for subsequent authentication of the client device with the enterprise mobility-management computing environment based on the identifier, the key, and the validation data; and
responsive to receiving from the client device a second authentication request comprising the access token, authenticating the client device based on the access token.

2. The method of claim 1, wherein authenticating the client device based on the access token comprises, responsive to receiving, by the computing system, data generated by the client device comprising the access token and a request to access the resource:
identifying, by the computing system, the validation data based on a portion of the data generated by the client device comprising the identifier;
decrypting, by the computing system, the authentication credentials using a portion of the data generated by the client device comprising the key; and
authenticating, by the computing system, the request using the authentication credentials.

3. The method of claim 2, comprising, prior to receiving the request to access the resource, updating, by the computing system, the validation data based on a modification to the authentication credentials indicated by data received by the computing system from a different client device associated with the user, wherein authenticating the request comprises authenticating the request based on the modification.

4. The method of claim 1, wherein authenticating the client device based on the access token comprises, responsive to receiving, by the computing system, data generated by the client device comprising the access token and a request to access a different resource of the enterprise mobility-management computing environment:
identifying, by the computing system, the validation data based on a portion of the data generated by the client device comprising the identifier;
decrypting, by the computing system, authentication credentials for the different resource using a portion of the data generated by the client device comprising the key; and
authenticating, by the computing system, the request using the authentication credentials for the different resource.

5. The method of claim 4, comprising, prior to receiving the request to access the different resource:
receiving, by the computing system and from a different client device associated with the user, the authentication credentials for the different resource; and
responsive to authenticating the different client device with the resource based on the authentication credentials for the different resource, updating, by the computing system, the validation data to include the authentication credentials for the different resource.

6. The method of claim 4, comprising, prior to receiving the request to access the different resource and responsive to a determination by the computing system that the user is authorized to utilize the different resource:
receiving, by the computing system, from the different resource, and responsive to a request generated by the computing system, the authentication credentials for the different resource; and
updating, by the computing system, the validation data to include the authentication credentials for the different resource.

7. The method of claim 1, wherein the validation data comprises authentication information distinct from the authentication credentials, received by the computing system from the client device, and input by the user via the client device in response to a prompt generated by the computing system via the client device, the method further comprising:
responsive to receiving, by the computing system, data generated by the client device comprising the access token and a request to access a different resource of the enterprise mobility-management computing environment:
identifying, by the computing system, the validation data based on a portion of the data generated by the client device comprising the identifier;
decrypting, by the computing system, authentication credentials for the different resource using a portion of the data generated by the client device comprising the key; and
responsive to determining that a portion of the data generated by the client device comprises the authentication information, authenticating, by the computing system, the request using the authentication credentials for the different resource.

8. A system comprising:
at least one processor; and
a memory comprising instructions that when executed by the at least one processor cause the system to:
receive, from a client device associated with a user of an enterprise mobility-management computing environment, a first authentication request comprising authentication credentials for a resource of the enterprise mobility-management computing environment;
responsive to authenticating the client device with the resource based on the authentication credentials:
store validation data comprising the authentication credentials and an identifier corresponding to at least one of the client device or the user;

generate an access token for the enterprise mobility-management computing environment comprising the identifier and a key utilized by the system to encrypt the authentication credentials; and communicate, to the client device, the access token for subsequent authentication of the client device with the enterprise mobility-management computing environment based on the identifier, the key, and the validation data; and responsive to receiving from the client device a second authentication request comprising the access token, authenticating the client device based on the access token.

9. The system of claim 8, wherein authenticating the client device based on the access token comprises, responsive to receiving data generated by the client device comprising the access token and a request to access the resource:

identifying the validation data based on a portion of the data generated by the client device comprising the identifier;

decrypting the authentication credentials using a portion of the data generated by the client device comprising the key; and authenticating the request using the authentication credentials.

10. The system of claim 9, wherein the instructions, when executed by the at least one processor, cause the system to:

prior to receiving the request to access the resource, update the validation data based on a modification to the authentication credentials indicated by data received by the system from a different client device associated with the user; and authenticate the request based on the modification.

11. The system of claim 8, wherein authenticating the client device based on the access token comprises, responsive to receiving data generated by the client device comprising the access token and a request to access a different resource of the enterprise mobility-management computing environment:

identifying the validation data based on a portion of the data generated by the client device comprising the identifier;

decrypting authentication credentials for the different resource using a portion of the data generated by the client device comprising the key; and authenticating the request using the authentication credentials for the different resource.

12. The system of claim 11, wherein the instructions, when executed by the at least one processor, cause the system to:

receive, from a different client device associated with the user, the authentication credentials for the different resource; and responsive to authenticating the different client device with the resource based on the authentication credentials for the different resource, update the validation data to include the authentication credentials for the different resource.

13. The system of claim 11, wherein the instructions, when executed by the at least one processor, cause the system to, prior to receiving the request to access the different resource and responsive to a determination by the system that the user is authorized to utilize the different resource:

receive, from the different resource and responsive to a request generated by the system, the authentication credentials for the different resource; and update the validation data to include the authentication credentials for the different resource.

14. The system of claim 8, wherein the validation data comprises authentication information distinct from the authentication credentials, received by the system from the client device, and input by the user via the client device in response to a prompt generated by the system via the client device, and wherein the instructions, when executed by the at least one processor, cause the system to, responsive to receiving data generated by the client device comprising the access token and a request to access a different resource of the enterprise mobility-management computing environment:

identify the validation data based on a portion of the data generated by the client device comprising the identifier;

decrypt authentication credentials for the different resource using a portion of the data generated by the client device comprising the key; and responsive to determining that a portion of the data generated by the client device comprises the authentication information, authenticate the request using the authentication credentials for the different resource.

15. One or more non-transitory computer-readable media comprising instructions that when executed by one or more computers cause the one or more computers to:

receive, from a client device associated with a user of an enterprise mobility-management computing environment, a first authentication request comprising authentication credentials for a resource of the enterprise mobility-management computing environment;

responsive to authenticating the client device with the resource based on the authentication credentials:

store validation data comprising the authentication credentials and an identifier corresponding to at least one of the client device or the user;

generate an access token for the enterprise mobility-management computing environment comprising the identifier and a key utilized by the one or more computers to encrypt the authentication credentials; and communicate, to the client device, the access token for subsequent authentication of the client device with the enterprise mobility-management computing environment based on the identifier, the key, and the validation data; and responsive to receiving from the client device a second authentication request comprising the access token, authenticating the client device based on the access token.

16. The one or more non-transitory computer-readable media of claim 15, wherein authenticating the client device based on the access token comprises, responsive to receiving data generated by the client device comprising the access token and a request to access the resource:

identifying the validation data based on a portion of the data generated by the client device comprising the identifier;

decrypting the authentication credentials using a portion of the data generated by the client device comprising the key; and authenticating the request using the authentication credentials.

17. The one or more non-transitory computer-readable media of claim 16, wherein the instructions, when executed by the one or more computers, cause the one or more computers to:

prior to receiving the request to access the resource, update the validation data based on a modification to the authentication credentials indicated by data received by the one or more computers from a different client device associated with the user; and authenticate the request based on the modification.

18. The one or more non-transitory computer-readable media of claim 15, wherein authenticating the client device based on the access token comprises, responsive to receiving data generated by the client device comprising the access token and a request to access a different resource of the enterprise mobility-management computing environment:

identifying the validation data based on a portion of the data generated by the client device comprising the identifier;

decrypting authentication credentials for the different resource using a portion of the data generated by the client device comprising the key; and authenticating the request using the authentication credentials for the different resource.

19. The one or more non-transitory computer-readable media of claim 18, wherein the instructions, when executed by the one or more computers, cause the one or more computers to:

receive, from a different client device associated with the user, the authentication credentials for the different resource; and responsive to authenticating the different client device with the resource based on the authentication credentials for the different resource, update the validation data to include the authentication credentials for the different resource.

20. The one or more non-transitory computer-readable media of claim 18, wherein the instructions, when executed by the one or more computers, cause the one or more computers to, prior to receiving the request to access the different resource and responsive to a determination by the one or more computers that the user is authorized to utilize the different resource:

receive, from the different resource and responsive to a request generated by the one or more computers, the authentication credentials for the different resource; and update the validation data to include the authentication credentials for the different resource.

* * * * *